(12) United States Patent
McKee

(10) Patent No.: US 7,552,517 B2
(45) Date of Patent: Jun. 30, 2009

(54) BELT CLAMP APPARATUS AND METHOD

(75) Inventor: James Patrick McKee, Ada, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 47 days.

(21) Appl. No.: 11/581,721

(22) Filed: Oct. 16, 2006

(65) Prior Publication Data

US 2008/0086849 A1    Apr. 17, 2008

(51) Int. Cl.
*A44B 21/00* (2006.01)
(52) U.S. Cl. ............ 24/456; 24/460; 24/DIG. 35; 24/573.09; 24/579.09
(58) Field of Classification Search ............. None
See application file for complete search history.

(56) References Cited

U.S. PATENT DOCUMENTS 1,332,442 A * 3/1920 Kane ............... 24/460
1,538,705 A * 5/1925 Kennedy et al. ............ 24/31 F

* cited by examiner

*Primary Examiner*—Jack W. Lavinder
(74) *Attorney, Agent, or Firm*—Fitch, Even, Tabin & Flannery

(57) ABSTRACT

An apparatus and method are provided for clamping a belt with a quick clamping action. The apparatus and method employ an impact force applied to a clamping device that causes a clamping portion of the clamping device to be driven into clamping engagement with the belt received in a housing for the clamping device. In one form, the clamping device has a clamp actuator that includes an impact receiving end preferably disposed outside the housing and a clamp member in the housing that is driven into clamping engagement with the belt by the actuator. The preferred belt clamp has the actuator and clamp member configured so that during belt pulling operations, the clamp also self-locks onto the belt to increase the clamping force applied thereto. In another aspect, the housing preferably has wall portions of varying thickness to provide increased strength where needed while keeping the weight thereof to a minimum.

23 Claims, 8 Drawing Sheets

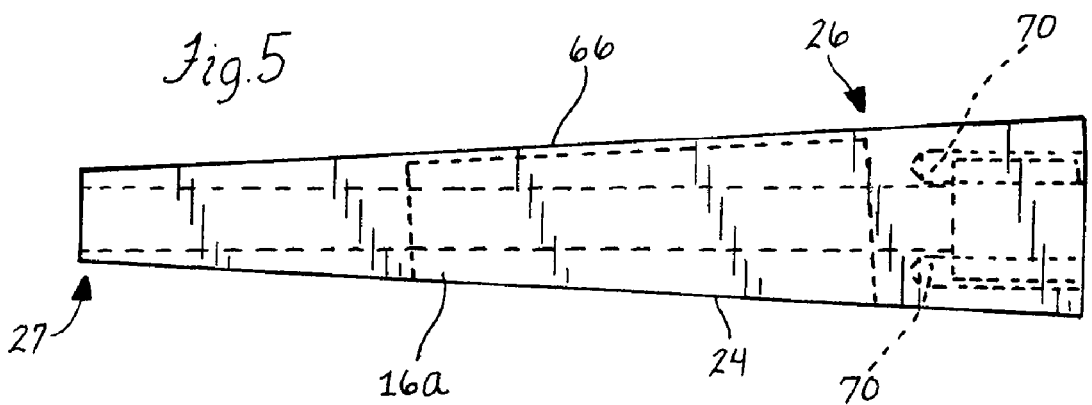
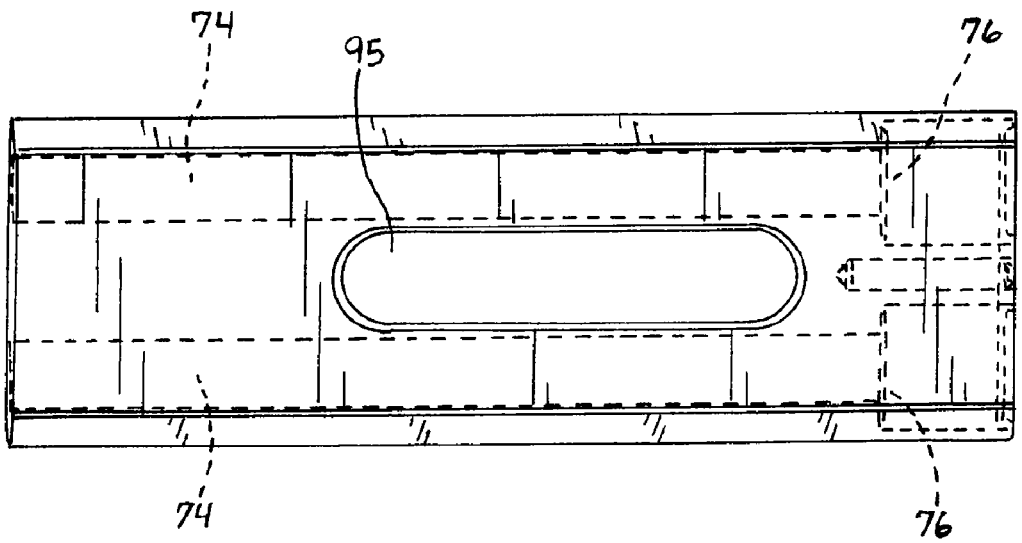

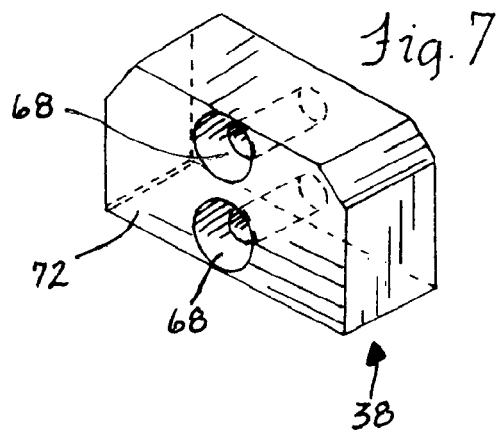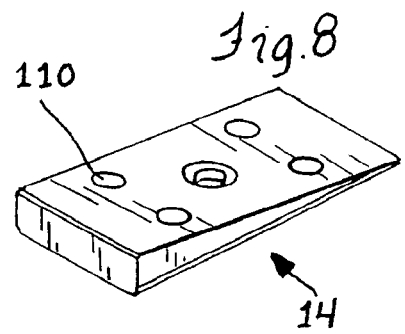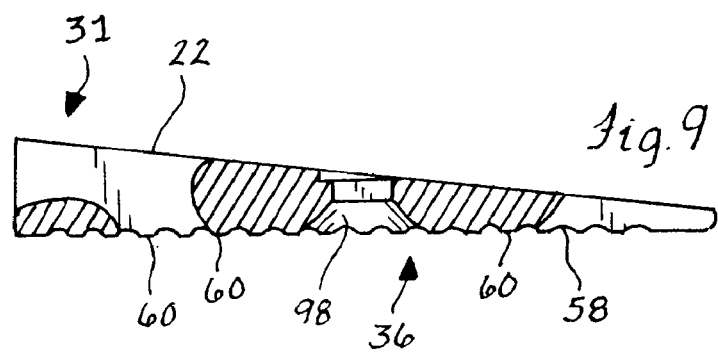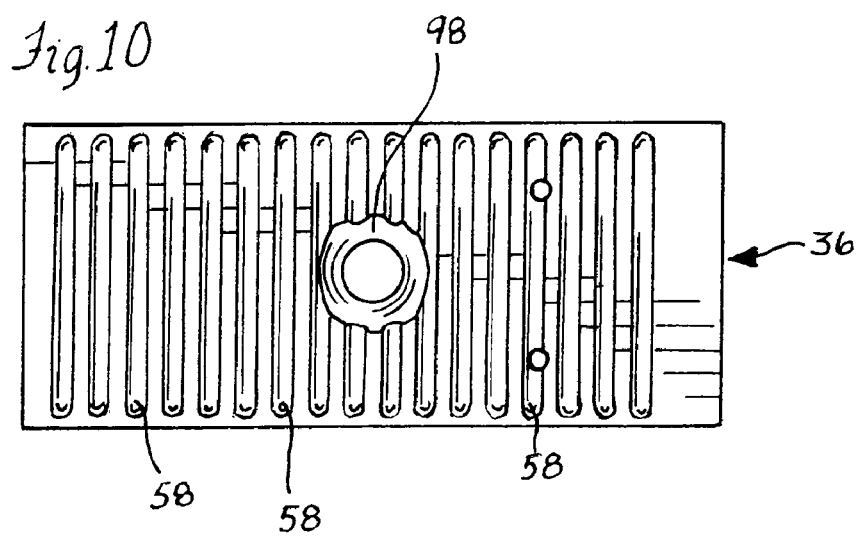

BELT CLAMP APPARATUS AND METHOD

FIELD OF THE INVENTION

The present invention relates to an apparatus for clamping a belt and, more particularly, to an apparatus and method for clamping a conveyor belt for a belt pulling operation to allow a belt maintenance operation to be performed thereon.

BACKGROUND OF THE INVENTION

Clamping mechanisms for conveyor belts typically either clamp along the side edges of the belt or are cross-belt clamps that clamp the belt across the entire lateral width thereof. With the belt clamped, various types of come-along mechanisms can then be connected to the clamps for pulling the belt to perform various maintenance operations thereon. For instance, a typical use of belt clamps is for changing or repairing a splice in the belt. In this instance, clamps will be used on either side of the splice, with the clamp or clamps on one side of the splice being pulled to draw the belt end toward the other end with the other end also pulled toward the opposite pulled end or simply anchored to the conveyor framework via the clamp or clamps thereon for making the necessary repairs to the splice. Because of the tension placed on endless conveyor belts, the belt clamps often experience very high loads. For instance, the takeup roller may apply 2000 lbs of force to the lower run of the belt that the belt clamps will need to overcome if this tension is not released during the belt pulling operation.

Another consideration is the size of the belt clamps. For example, in package handling applications utilizing light duty conveyor belts, there are side panel walls adjacent to the belt side edges for keeping the packages in position on the belt. These side panel walls are typically spaced on the order of approximately ¾ of an inch from the side edges of the light duty belts that carry the packages thereon. Particularly in this type of light duty application, it is desirable for the belt clamps to have a compact configuration so that the user can more easily apply these to the side edges of the belts to be clamped. Accordingly, there is a need for a belt clamp that is of high strength while also having a compact configuration for being clamped on belt edges for the belt pulling operation.

Belt clamps that have a self-locking function are known. Typically, these self-locking belt clamps have a pair of pivotal grip jaws that are pivotally connected to pivot links with the links pivotally connected to a pull loop. When a pull force is applied to the pull loop, the links pivot the gripping jaws into a tight clamping engagement with the upper and lower surfaces of the belt with this clamping force increasing as the pull force increases. In this manner, these belt clamps automatically lock or self-lock onto the belt when the pull force is applied. However, prior to application of the pull force, these belt clamps are not fixed to the belt, and this may make it difficult for users of these belt clamps to locate the clamps at a desired position on the belt. Further, these types of self-locking belt clamps are more susceptible to slippage along the belt prior to application of a sufficiently high pull force so that the jaws exert a sufficient clamping force to keep the jaws clamped and fixed on the belt. Slippage of the contoured gripping surfaces of the jaws along the belt can damage the belt and also can present safety concerns as the pull force is being applied to the clamps.

A belt clamp provided by Watkins Air Support Products allows a user to clamp and lock the belt clamp to the belt prior to the belt pulling operation. The Watkins' belt clamp has a pair of drive screws that both need to be turned to advance the screws into a generally U-shaped housing to drive a belt clamp member into clamped and locked engagement with the conveyor belt in the housing. This is a time consuming procedure as both screws need to be turned before the clamping member is driven sufficiently downward to be clamped against the belt. Further, although the Watkins' belt clamp is prelocked to the belt prior to a belt pulling operation, it does not have self-locking feature such that it has been found that with pull forces of approximately 650 lbs, the belt clamp may slip on the belt. Also, it can be difficult to insure that the same amount of torque force is applied to each drive screw such that the clamp force applied by the clamp member is substantially uniformly distributed thereacross.

Accordingly, there is a need for a belt clamp that is operable to be quickly clamped to a belt. Further, a belt clamp that has both self-locking and prelock features would be desirable.

SUMMARY OF THE INVENTION

In accordance with one aspect of the present invention, a belt clamping apparatus is provided that has a housing in which a belt is received. A clamping device has an impact portion adapted to receive an impact force so that a clamping portion of the device is driven into clamping engagement with the belt in the housing. In this manner, a belt clamping operation can be quickly done by application of one or more blows from a mallet, for example, against the impact portion of the clamping device.

The clamping device preferably includes a distinct actuator member and clamp member with the members configured so that when the actuator member is impacted with an impact force in a direction generally parallel to the belt, the clamp member is cammingly driven in a transverse direction, and preferably generally perpendicular to the belt, into clamping engagement therewith. Alternatively, the clamping device can include only a clamp member that is configured to cooperate with the housing so that when the impact blow is applied thereto in a direction generally parallel to the belt, the clamp member is cammingly driven in a transverse direction into clamping engagement with the belt. In this manner, a separate actuator member is avoided.

The arrangement where distinct actuator and clamp members are employed is preferred over the arrangement without the actuator member from the standpoint of avoiding a sliding action on the belt with the clamp member as it shifts into clamping engagement therewith. Instead, with the distinct actuator and clamp members, only the actuator member slides in a direction generally along the belt while the clamp member shifts generally perpendicular to the belt to clamp onto the belt. In this regard, it is preferred that the clamp member be fixed against sliding in the housing.

Accordingly, in accordance with a preferred form of the present invention, a belt clamping apparatus is provided that has an actuator and a clamp member that are separate components with the clamp member being driven into clamping engagement with a belt when an impact force is applied to the actuator. As mentioned, for instance several quick blows from a mallet or other impact applying tool against an impact receiving end of the actuator will cause the actuator to drive the clamp member into tight clamping engagement with the belt in a very quick and easy manner. Accordingly, the present belt clamp is much more quickly clamped to the belt than the previously-described clamp that requires a user to turn a pair of tightening screws to advance these screws sufficiently far for driving the clamp member into clamping engagement with the belt.

Preferably, the actuator and clamp member are configured so that when the impact blow or blows are delivered to the actuator, the clamp member will be driven into a clamped and prelocked position against the belt prior to application of a pull force to the clamp.

A drive interface between the clamp actuator and the clamp member is preferably configured so that application of an impact force in a direction generally parallel to the belt causes the clamp member to be driven downwardly in the housing toward the belt. Preferably, the drive interface is a cam interface between the clamp actuator and the clamp member.

In one form, the clamp actuator has an impact portion that is outside the housing for the belt clamp. The impact portion is adapted to receive an impact force for driving the clamp member against the belt for quick clamping thereof with the clamping member.

In another form, a belt clamping apparatus is provided including a compact housing, an upper cam member having a lower inclined cam surface, and a lower cam member in the housing having an upper inclined cam surface. The cam surfaces cooperate to drive the lower cam member into clamped engagement with the belt. The cam surfaces are provided with a predetermined inclination so that the length of the upper cam member is kept to a minimum and the lower cam member is prelocked in clamped engagement with the belt prior to pulling of the belt.

In a preferred form, the upper cam member has a length of approximately 9 inches and the predetermined inclination is approximately 7 degrees.

In another aspect, the housing includes a body having a generally C-shaped profile with wall portions that vary in thickness in cross-section. The body has a thick, vertical web portion, and a lower shelf portion and an upper roof portion that both extend away from the web portion and which generally have a greater thickness closer to the web portion than further therefrom. The thick web portion and the thick adjacent portions of the shelf and roof portions of the body provide the body with substantially uniform strength particularly along the varying thickness shelf and roof portions thereof while also keeping the weight thereof to a minimum, e.g. less than 5 lbs. with an extruded housing. This is in contrast to the previously-described belt clamp having a U-shaped body that is of substantially constant cross-sectional thickness.

In a preferred form, the lower shelf portion includes a lip portion that protrudes beyond the upper roof portion away from the web portion for ease in fitting the belt into the internal space.

In another aspect of the invention, a method of clamping a belt for belt pulling operation is provided and includes fitting a belt into a housing under a clamping device, and impacting an end of the clamping device to drive a clamping portion thereof in the housing toward the belt. The method further includes clamping the belt with the clamping portion against a clamping surface in the housing to lock the clamp member against the belt in a prelocked position in the housing.

Preferably, the clamping device end is impacted by applying an impact force thereto in a direction generally parallel to the belt.

In another preferred form, the clamped belt is pulled by pulling the clamping device at an end thereof opposite to the end that is impacted.

BRIEF DESCRIPTION OF THE DRAWINGS

FIG. 5 is an elevational view of the upper cam member showing an inclined, lower cam surface thereof;

FIG. 6 is a plan view of the upper cam member showing an elongated slot extending therethrough;

FIG. 7 is a perspective view of an impact plate to be connected to one end of the upper cam member;

FIG. 8 is a perspective view of the lower cam member showing the wedge confirmation thereof;

FIG. 9 is an elevational view of the lower cam member showing an upper inclined surface and a lower clamping surface thereof;

FIG. 10 is a bottom plan view of the lower cam member showing a series of grooves and ridges formed in the lower clamping surface;

DETAILED DESCRIPTION OF THE PREFERRED EMBODIMENTS

Figure 1:
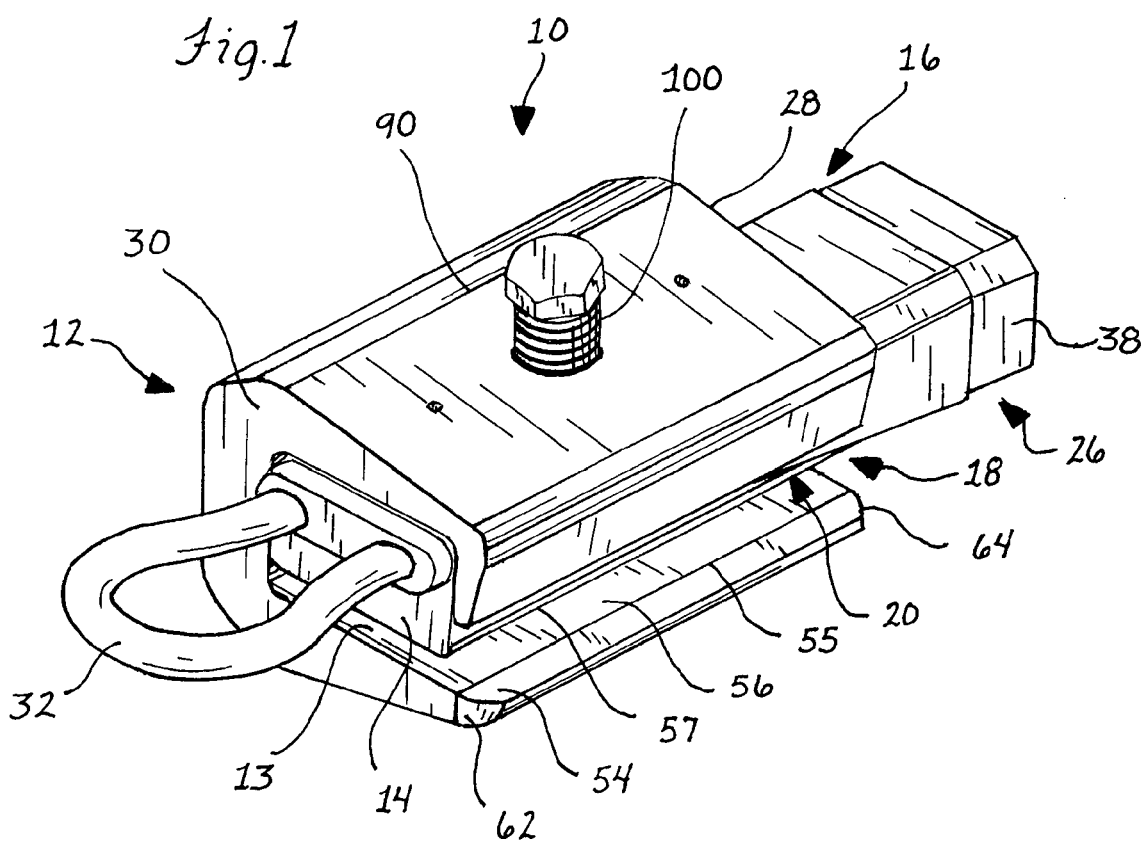
FIG. 1 is a perspective view of a belt clamping apparatus in accordance with the present invention showing a generally C-shaped housing, and upper and lower cam members.

In FIG. 1, a belt clamp apparatus 10 is illustrated which is adapted for clamping onto a conveyor belt and for pulling the conveyor belt or holding the clamped belt in place as another end of the belt is pulled toward the held end for belt maintenance operations such as for replacing or servicing a belt splice. The belt clamp apparatus 10 has a housing 12 in which a clamping device 13 is received. In the belt clamp 10, the clamping device 13 includes a clamping member 14 and a separate clamp actuator member 16. Further, the housing 12 has an opening 18 along one side thereof through which an edge of the conveyor belt can be fit for being clamped in the housing 12 by the clamp member 14. For this purpose, the clamp actuator 16 is configured to received an impact as by a blow from a mallet or other impact delivering tool to quickly cause the clamp member 14 to shift into clamping engagement with the belt in the housing 12. In this manner, the present belt clamp apparatus 10 provides a much quicker belt clamping operation than prior belt clamps.

The clamp member 14 and clamp actuator 16 have a drive interface 20 therebetween so that the clamp actuator 16 is operable to drive the clamp member 14 into clamping engagement with the belt. The drive interface 20 is preferably a cam interface formed by inclined, ramp surfaces 22 and 24 of the clamp member 14 and clamp actuator 16, respectively, as best seen in FIGS. 5 and 9. In this regard, the clamp member 14 and clamp actuator 16 are preferably wedge-shaped, cam members 14 and 16 with the cam surfaces 22 and 24 cooperating to cammingly drive the clamp cam member 14 into clamping engagement with the belt when the actuator cam member 16 is impacted.

As mentioned, the cam members 14 and 16 are configured to allow an impact force to be applied to the actuator cam member 16 for driving the clamp cam member 14 into clamping engagement with the belt. In this regard, the preferred and illustrated configuration of the drive interface 20, and specifically the ramp surfaces 22 and 24 thereat, allow an impact force to be applied to the clamp actuator 16 in a direction that is generally parallel to the conveyor belt for causing the clamp member 14 to be driven into clamped engagement with the belt in a direction transverse to the direction of the applied impact force.

More specifically, the clamp cam member 14 is generally disposed below the actuator cam member 16 at vertically aligned locations therebetween in the housing 12. Referring to FIG. 1, applying an impact blow to the large end 26 of the upper clamp actuator member 16 outside the housing 12 at end 28 thereof causes the actuator member 16 to slide in the direction of the impact blow along the length of the housing 12 toward the other end 30 thereof with the ramp surface 24 thereof sliding along the ramp surface 22 of the lower clamp member 14 to drive it downwardly in the housing 12 generally perpendicular to the direction of the impact blow so that it is driven into clamped engagement with the belt. In this manner, lower clamping surface 36 of the cam clamp member 14 does not travel or slide along the belt as it is driven into clamping engagement therewith. The clamp cam member 14 is held against lengthwise sliding in the housing and preferably drawn upwardly therein, as will be described further hereinafter.

In this regard, the clamp member 14 has its large end 31 inside the housing 12 disposed adjacent the end 30. Prior to driving of the actuator member 16, there is space in the housing 12 below the clamp member end 31. The housing 12 and clamp end 31 are sized so that the full thickness of the actuator member 16 toward the large end 26 will not fit thereabove after the clamp cam member 14 has been driven downward into the space therebelow, and only portions of the actuator member at and adjacent the small end 27 thereof will fit tightly into this space. With the actuator member 16 driven into the housing 12 via the impact blows applied thereto, the cam members 14 and 16 will be in substantially tight, mating relationship in the housing 12 with the respective large end portions generally vertically aligned with the respective small end portions of one another. The clamping forces are taken by the housing 12 with the belt clamped against a lower portion 42 of the housing 12 and the upper cam actuator member 16 wedged tightly against an upper portion 44 of the housing 12.

Depending on the thickness of the belt, only a small portion of the actuator end 26 may project slightly out from the housing end 28 with the belt clamped in the housing 12. With very thin belts, e.g., 1.5 mm in thickness, the actuator end 26 may be received in the housing 12 so that it is substantially flush with housing end 28. In this instance, the small end 27 of the actuator member 16 will project out beyond housing end 30, which can also occur even with thicker belts depending on how far the opposite actuator end 26 projects beyond housing end 28. To this end, the lower clamp member 14 preferably has a length closely approximating that of the housing 12 in which it resides, while the upper actuator member 16 is slightly longer. By way of example and not limitation, the lower clamp member 14 is approximately 6.0 inches in length and the upper actuator member 16 has a main body 16a that is approximately 8.0 inches in length with a one inch thick impact plate 38 described hereinafter preferably attached at the impact end 26 so that the total actuator length is approximately 9.0 inches. Further, the thickness or height of the large end 31 of the clamp member 14 can be approximately 0.920 inch, and the thickness or height of the corresponding small end 27 of the actuator member 16 is approximately 0.750 inch, and the height of internal space 46 of the housing 12 at the housing end 30 is slightly larger than the sum of the thickness of the ends 27 and 31 at approximately 2.120 inches. The housing size allows for a range of different thickness belts to be clamped in the housing 12, e.g., belt thicknesses in the range of approximately 1.5 mm to approximately 8.0 mm. The tight sizing of the wedge cam members 14 and 16 in the housing space 46 generates a secure friction lock therebetween to keep the clamp member 14 prelocked in clamping engagement with the belt in the housing 12 with the clamping forces reacted out to and taken by the robust housing 12, as discussed further hereinafter.

The inclination of the ramp surfaces 22 and 24 are predetermined so as to keep the length of the housing 12 to a minimum while also providing the belt clamp apparatus 10 herein with the prelock feature discussed above to keep the clamp member 14 in fixed, clamped engagement with the belt prior to a belt pulling operation. In this regard, it has been determined that a maximum inclination of the ramp surfaces 22 and 24 of approximately 12 degrees could be employed while achieving the fixed, preclamped or prelocked position of the clamp member 14 described above. In the preferred and illustrated form, the inclination of the ramp surfaces 22 and 24 is set at approximately 7 degrees from the horizontal, the length of the housing 12 between the opposite ends 28 and 30 thereof it is approximately 6 inches, and the length of actuator member 16 between ends 26 and 27 thereof is approximately 9 inches. With the above dimensions and with the apparatus 10 in its most compact configuration in a locked, clamped configuration so that the upper, actuator member has been driven into the housing 12 so that only a small portion at the actuator large impact receiving end 26 may protrude therefrom as mentioned above, the total length of the apparatus 10 from the impact receiving end 26 of the clamp actuator 16 to the end of a pull loop 32 described hereinafter is approximately 13 inches. It should be noted that with lower inclinations than 7 degrees the length of the apparatus 10, and specifically the upper clamp actuator 16 will necessarily increase and with inclinations that are greater, it becomes more difficult for the clamp member 14 to be prelocked in clamped engagement with the belt. Accordingly, it has been found that the selected wedge angle or inclination of approximately 7 degrees provides the apparatus 10 and the upper clamp actuator 16 thereof with sufficient compactness, i.e. approximately 9 inches in length for the actuator 16 and approximately 13 inches in overall length for the apparatus 10, while also providing it with the desired prelocking ability.

In addition, the wedge angle for the clamp actuator 16 could be split between the lower ramp surface 24 and an upper surface 66 thereof. For example, with the preferred 7 degree wedge angle, the lower ramp surface 24 could be provided with a 4 degree inclination while the upper surface 66 would include a 3 degree inclination both extending at an incline generally upward from the end 26 to the end 27 of the wedge actuator member 16. The housing 12 has an upper, internal surface 65 that is not inclined so that it extends generally horizontally and cooperates with the inclined surface 66 of the actuator member 16 so that when its end 26 is impacted, the actuator member surface 66 will slide flush against housing surface 65. With the inclined surface 66 oriented horizontally, flush against housing surface 65, the lower surface 24 will take on a greater inclination from the horizontal to compensate for tilting or lifting of the actuator member 16 to bring its inclined upper surface 66 into flush engagement with the housing surface 65. In this regard, the ramp surface 24 will have an increased inclination that includes that of the upper surface 66 so that in the example discussed above, the ramp surface 24 will take on a 7 degree inclination in the housing 12 so that lower ramp surface 24 stays in flush driving engagement with the ramp surface 22 of the clamp member 14 when the actuator end 26 is impacted.

In addition, it should be noted that the wedge angle could also have a portion included on the housing surface 65 so that it could be inclined to extend generally upward from the end 28 to the end 30 thereof. In this manner, the wedge angle could be split amongst any combination of the three surfaces 24, 65 and 66 so that in total their ramp angles match that of the ramp angle of the clamp member surface 22 so that the ramp surface 24 is in flush camming engagement therewith when the actuator end 26 is impacted. In this manner, the clamping surface 36 is maintained in parallel orientation to the underlying belt against which it is driven and clamped.

The present apparatus 10 also preferably includes a self-locking function so that when a pull force is applied to the apparatus 10, the clamping force applied by the clamp member 14 on the belt increases. While it would be possible to drive the clamp actuator member 16 with a drive screw, this is not preferred in terms of speed of the clamping operation. In this regard, the ramp surfaces 22 and 24 generally extend upwardly at an incline from a lower position at the end 28 of the housing toward the other end 30 of the housing 12 at which the pull loop 32 is connected to the small end 27 of the clamp actuator member 16. Accordingly, application of a pull force to the pull loop 32 causes the lower ramp surface 24 of the upper clamp actuator member 16 to cammingly slide relative to the upper ramp surface 22 of the lower clamp member 14 to apply higher clamp forces to the belt via the lower clamping surface 36 of the lower clamp member 14 that is already in fixed, clamped engagement with the belt. In other words, the pull force applied to the pull loop 32 pulls the upper cam member 16 in the same direction as the impact force applied to the impact receiving end 26 thereof. Since the pull loop 32 extends from one end 27 of the actuator member 16, to have the belt opening 18 in the proper orientation for receiving a belt side edge therein, two mirror image belt clamps 10 will be provided so that one clamp 10 can be clamped on one side edge of the belt and the other mirror image clamp 10 can be clamped on the opposite belt side edge with their respective pull loops 32 extending in the same direction.

When pulling the actuator member 16 with the belt clamped by the clamp member 14, the actuator member 16 typically will undergo sliding, linear travel along the length of the housing 12 that varies depending on the amount of the pull force, compressibility of the belt, and deflection of the housing lower and upper portions 42 and 44. The predetermined wedge angle determines the ratio that the actuator member 16 will travel in the longitudinal direction versus the amount the belt compresses and/or the housing portions 42 and 44 deflect in a direction generally perpendicular to the longitudinal direction. With the preferred and illustrated 7 degree wedge angle, this ratio is approximately 8:1 so that for every 0.10 inch of belt compression or housing deflection, the actuator member 16 can be pulled 0.80 inch, for example. It should be noted, however, that some applications will have such light pull loads, such as where the takeup roller has been off-loaded from the conveyor system, that the clamps 10 primarily will only be supporting the belt weight during the belt pulling operation. In this instance, there will be very little if any travel of the actuator member 16 such that the primary clamping force on the belt will be generated during the initial clamping operation that locks the clamp 10 on the belt prior to a belt pulling operation.

The cooperating ramp surfaces 22 and 24 provide a very large surface area for the drive interface 20 between the cam members 14 and 16. In this manner, drive force is not concentrated locally such as at a relatively small drive screws in comparison to the size of the clamp member as in the previously-described clamp. Further, the cam interface 20 insures that the clamp cam member 14 is shifted downwardly in the housing 12 in a substantially uniform manner without having the clamp surface 36 skew or tilt as it shifts downwardly toward the belt. In this manner, the present belt clamp apparatus 10 provides a substantially uniform clamping force to the belt across the clamping surface 36.

Figure 2:
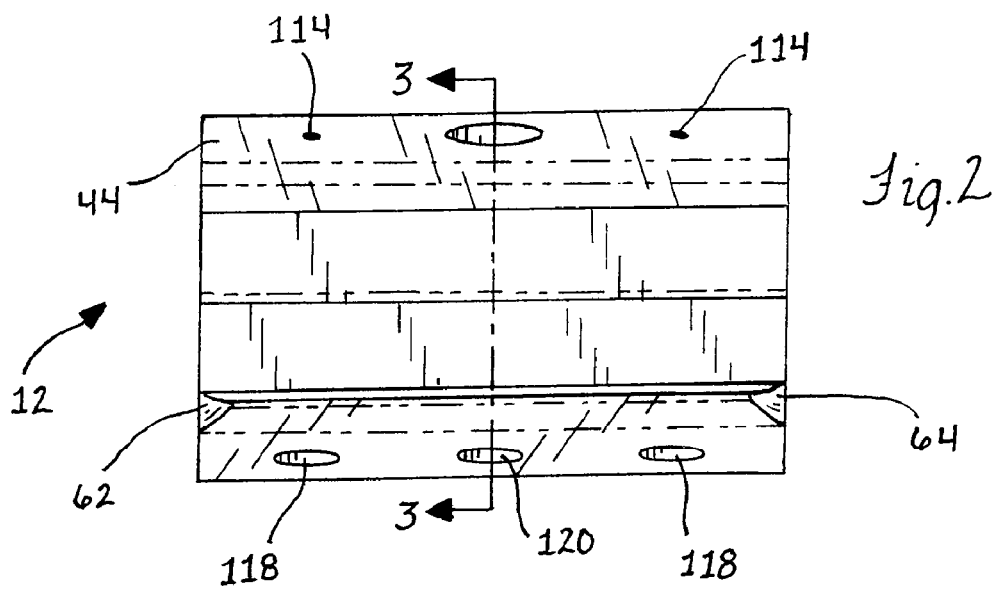
FIG. 2 is a front elevational view of the housing showing an internal space in which the cam members are disposed.
Figure 3:
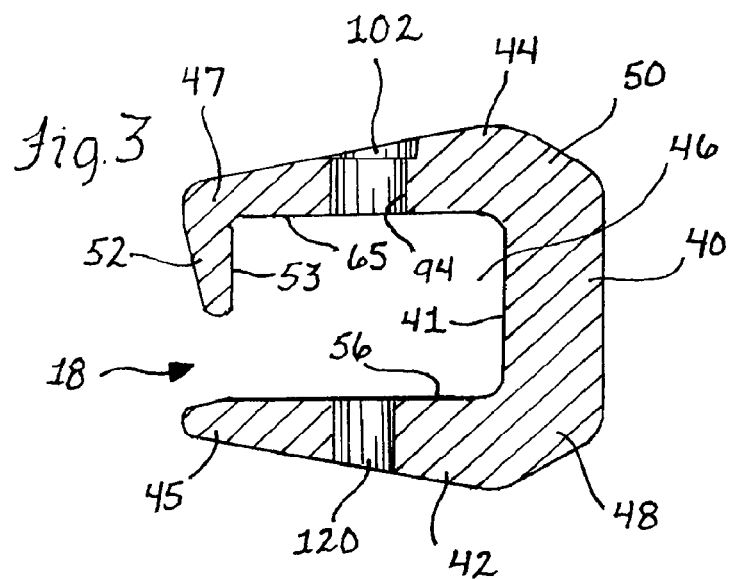
FIG. 3 is a cross-sectional view taken along line 3-3 of FIG. 2 showing the varying thicknesses of the wall portions of the housing.

The housing 12 is constructed to provide both high strength for taking the high loads generated during a belt pulling operation while also having a relatively compact configuration, as previously mentioned. Referring to FIGS. 2 and 3, the preferred housing has a generally C-shaped profile with varying thickness wall portions thereof. Preferably, the housing 12 is extruded for manufacturing efficiency in providing the varying thickness wall portions. As shown, there is a relatively thick, vertical web or base portion 40 that interconnects a lower shelf or arm portion 42 and an upper roof or arm portion 44. The wall portions 40-44 extend about the internal space 46 of the housing 12. By extruding the housing 12 so that the wall portions 40-44 have varying thicknesses, the wall portions 40-44 can be provided with increased thickness to reduce stress at locations where high stresses may otherwise occur during belt clamping and pulling operations while decreasing the thickness where such stresses are not present in the housing 12. In this manner, the housing 12 can be provided with an optimum combination of high strength and light weight. Herein, the preferred and illustrated housing has a weight of approximately 4.8 lbs while still being of sufficient strength to handle the high loads it will likely have to support during belt pulling operations, e.g. 2000 lbs and greater. Also, the total weight of the illustrated belt clamp 10 can be approximately 11.0 lbs.

More specifically, the housing lower and upper portions 42 and 44 taper from a large thickness adjacent the vertical, web wall portion 40 toward smaller thickness ends further away from the wall portion 40. In addition, it can be seen that beveled corner portions 48 and 50 are provided between the respective wall portions 40 and 42, and 40 and 44 having a relatively large thickness similar to that of vertical wall portion 40 and adjacent portions of the shelf and roof wall portions 42 and 44. In this manner, the housing walls are thick at locations toward the base wall portion 40 where the stresses would otherwise be the greatest during belt pulling operations, and are thinnest at locations furthest from the base wall portion 40 where stresses are at their minimum during belt pulling operations. Since the lower and upper wall portions 42 and 44 are interconnected by the web wall portion 40, the wall portions 42 and 44 act as cantilevered beams from the wall portion 40. In this regard, the shear forces and moments generated on the wall portions 42 and 44 during belt clamping and pulling operations increase as the wall portions 42 and 44 approach the wall portion 40. Accordingly, by having the wall portions 42 and 44 increase in thickness at portions thereof adjacent the web wall portion 46, the lower shelf wall portion 42 and the upper roof wall portion 44 are provided with substantially uniform strength along their length in a direction generally perpendicular to the web wall portion 40 to the respective distal ends 45 and 47 thereof.

The housing 12 has a depending projection 52 from the end 47 of the roof portion 44 with the projection 52 being operable to keep the wedge cam member 16 from turning or rotating in the housing internal space 46 such as when it is impacted or pulled during belt clamping and pulling operations. Accordingly, the spacing of the projection 52 from the web wall portion 40, and specifically the respective facing inner surfaces 53 and 41 thereof, is slightly greater than the width across the wedge cam member 16. As shown, the opening 18 between the lower end of the projection 52 and the housing shelf portion 42 has a relatively short height that allows the full range of varying thickness conveyor belts to be clamped with the apparatus 10 to be fit into the internal space 46.

The preferred and illustrated housing 12 includes a lip projection 54 that extends the end of the shelf portion 42 so that it extends further away from the base wall portion 40 and beyond the depending projection 52 at the end of the roof portion 44, as can be seen in FIGS. 1 and 3. The compact size of the housing 12 allows it to be manipulated in confined spaces between side edges of a conveyor belt and side panels that may be adjacent thereto such as in package handling applications, as has been previously described. In this instance, the housing 12 is oriented so that the belt receiving opening 18 faces downwardly with the housing 12 lowered and the lip projection 54 utilized to scoop the belt through the opening 18 into the internal space 46 as the housing 12 is pivoted. Accordingly, the lip projection 54 serves to guide or lead the side edge of the belt through the opening 18 and into the housing internal space 46, where the housing 12 needs to be pivoted to fit the belt therein such as may be necessary in light-duty package handling applications. The lip projection 54 can have a downwardly inclined surface portion 55 to facilitate fitting the belt through the opening 18 as the housing arm portion 42 is pivoted under the belt. In addition, at least the bottom corner 57 of the clamp member 14 adjacent the opening 18 can be radiused or curved so that the curved corner 57 together with the lip surface 55 cooperate to guide or funnel the belt side edge portion into the space beneath the clamp member 14 in the housing 12.

The lip projection 54 extends from a bottom clamping surface 56 of the shelf wall portion 42 in the housing internal space 46. The belt is clamped between the clamp surface 36 of the cam clamp member 14 and the clamp surface 56 of the housing 12. The clamp surface 56 has a smooth, flat configuration and the clamp surface 36 of the cam member 14 has a contoured surface, as shown in FIGS. 9 and 10. Manifestly, the clamping suface 56 could be contoured to provide for gripping engagement with the conveyor belt while the clamping surface 36 could be the smooth flat surface, or both of the clamping surfaces 36 and 56 could be provided with a contour for gripping into the belt. As shown, the clamp surface 36 has a series of grooves 58 that form raised ridges 60 therebetween. The grooves 58 and ridges 60 extend across the width of the clamping surface 36 and provide the clamping surface 36 with a firm grip on the belt when driven into engagement therewith.

The housing 12 also preferably has rounded corners 62 and 64 at either end of the lower shelf portion 42, and specifically the lip projection 54 thereof, as can best be seen in FIGS. 1 and 2. When the belt is clamped in the housing 12 and extends along the clamping surface 56 and out beyond the lip projection 54, the rounded corners 62 and 64 minimize the potential for these corners 62 and 64 to dig or bite into the belt, especially during a belt pulling operation.

The internal space 46 of the housing 12 is preferably tapered so that it slightly narrows in a direction away from the vertical wall portion 40. In other words, the lower clamping surface 56 in the housing 12 and opposite, upper surface 65 in the housing 12 preferably extend away from the wall portion 40 so that they taper slightly toward each other, rather than being perfectly parallel with one another. In this manner, when the clamping and pull forces are applied to the housing 12, any deflection of the arm or wall portion 42 of the housing 12 downwardly and/or deflection of the upper arm of wall portion 44 upwardly as the clamping forces increase will cause the surfaces 56 and 65 to shift into more of a parallel orientation with each other without compromising the secure clamping of the belt by the clamp member 14 against the clamping surface 56.

Figure 4:
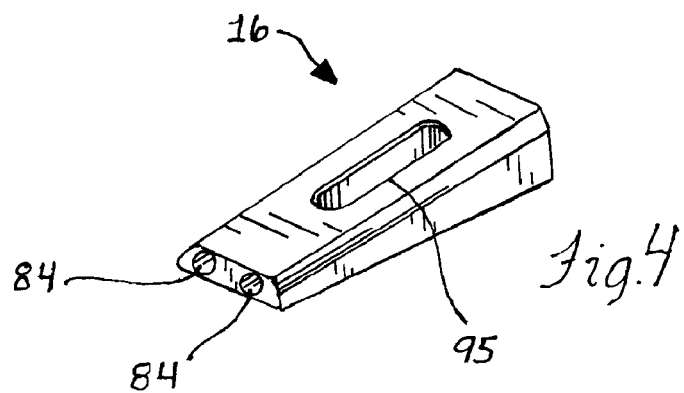
FIG. 4 is a perspective view of the upper cam member showing the wedge configuration thereof.
Figure 11:
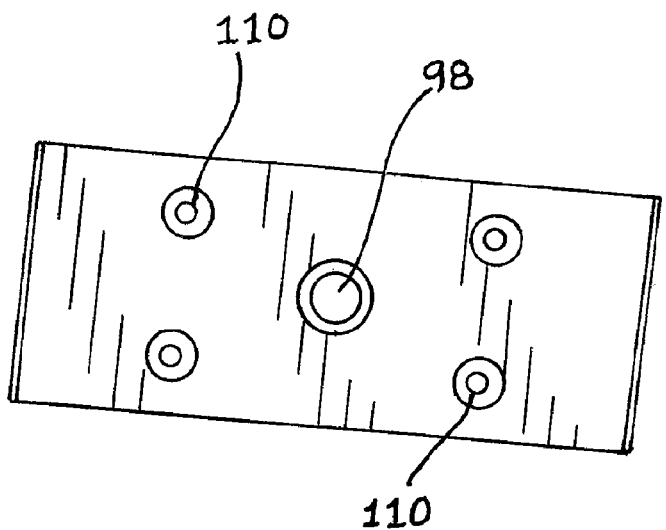
FIG. 11 is a plan view of the lower cam member showing a central opening for receiving an end of a biasing device therein.

Turning to more of the details, the wedge-shaped, upper cam actuator member 16 is best seen in FIGS. 4 and 5. The upper cam member 16 has an upper, slide surface 66 configured for sliding relative to the corresponding housing surface in the internal space 46 thereof. The upper surface 66 has a flat configuration and, with the member 16 received in the housing 12, can extend generally parallel with the horizontal. As has been discussed, the lower cam surface 24 of the upper cam member 16 tapers upwardly from the large end 26 toward the small end 27 of the cam member 14 at an inclination to the horizontal and thus to the upper surface 66. As illustrated, the inclination of the cam surface 24 to the horizontal is preferably 7 degrees, although other inclinations can also be employed as has been previously discussed.

The actuator end 26 can be configured for receipt of the impact of force as by securing an impact receiving member thereto, such as impact plate 38, shown in FIGS. 1 and 7. The impact plate 38 can be of a heat treated steel material to maximize the impact strength thereof. The impact plate 38 can be secured to the end via screw fasteners received in aligned countersunk throughbores 68 in the impact plate 38 and tapped blind bores 70 in the cam member end 26, as shown in FIGS. 5 and 7. In this manner, the screw fasteners can be received in the countersunk bores 68 so that the heads do not project beyond the impact surface 72 of the impact plate member 38 with the threaded ends of the screws threaded into threaded bores 70 for tightly drawing the impact plate member 38 against the end 26 of the cam member 16.

Figure 12:
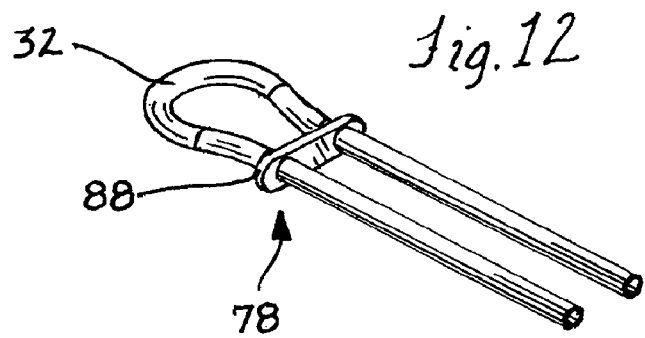
FIG. 12 is a perspective view of a pull loop assembly.
Figure 13:
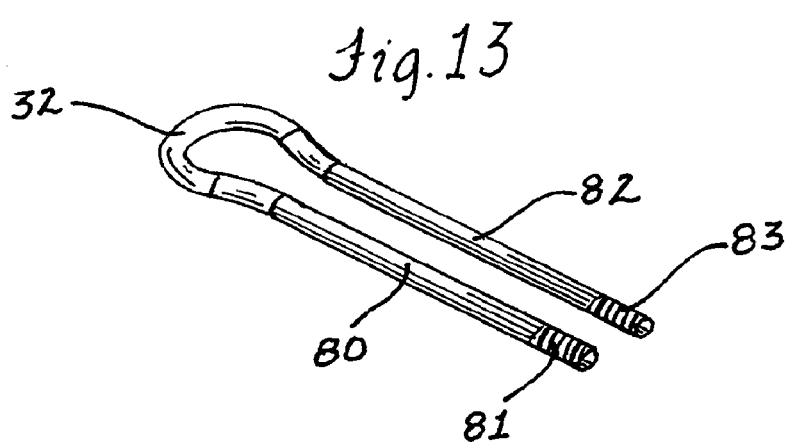
FIG. 13 is a perspective view of a pull loop of the pull loop assembly showing a pair of long, parallel rod portions interconnected by a loop portion.
Figure 14:
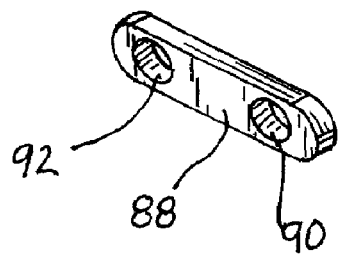
FIG. 14 is a perspective view of plate member of the pull loop assembly showing a pair of openings through which the rod portions extend.

The illustrated body 16a of the wedge cam member 16 has a pair of laterally spaced through bores 74 extending therethrough connecting the pull loop 32 thereto. As previously discussed, the pull loop 32 is connected to the small end 34 of the actuator member 16. Referring to FIGS. 12-14, the pull loop 32 can be part of a pull loop assembly 78 with one component including a pair of long generally parallel extending rod portions 80 and 82 that are interconnected by the pull loop portion 32. The cam member body 16a has a pair of openings 84 to the laterally spaced bores 74 at the small end 27 thereof that are sized to receive the corresponding pull loop rod portions 80 and 82 therein to extend for substantially the entire length of the cam member body 16a. A stop plate 88 of the pull loop assembly 78 abuts the small end 27 of the cam member 16 to define the extent to which the rod portions 80 and 82 extend into the bores 74. By way of example and not limitation, as previously mentioned the length of the cam member body 16a can be approximately 8 inches while the length of the rod portions from the stop plate 88 to the ends thereof can be approximately 7.88 inches. In this regard, the body 16a has a pair of enlarged counterbores 76 of the bores 74 at the large end 26 that are sized to receive threaded ends 81 and 83 of the respective rod portions 80 and 82 therein with the stop plate 88 abutting the cam member end 27. The stop plate 88 has a pair of through openings 90 and 92 through which the rod portions 80 and 82 extend with the plate affixed to the loop assembly 78 as by welding at the side thereof facing the loop portion 32. To affix the pull loop assembly 78 to the cam member 16, lock washers and nuts are placed on the threaded ends 81 and 83 of the rod portions 80 and 82 in the counterbores 76 to draw the stop plate 88 tight against the end 27. After clamping to the belt, the apparatus 10 can be unclamped by applying an impact blow to the loop portion 32 projecting out from the housing end 30.

Figure 15:
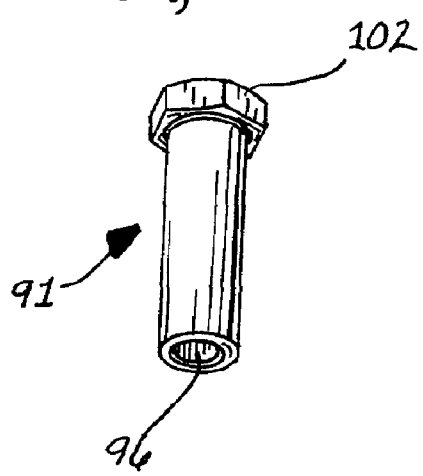
FIG. 15 is a perspective view of a guide bolt of the biasing device.
Figure 16:
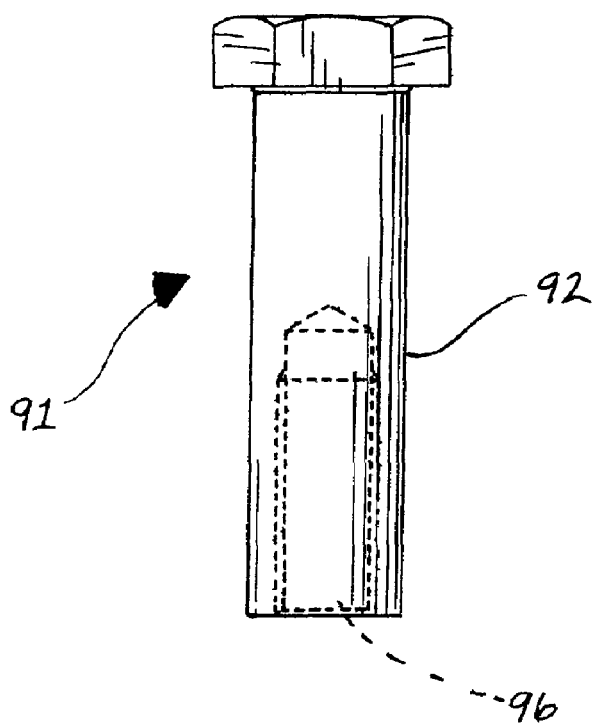
FIG. 16 is an elevational view of the guide bolt.

To hold the lower cam member 14 in the housing 12 and keep the lower cam member 14 in a raised position in the housing 12, a biasing device 90 can be employed that is connected to the housing 12 and the lower cam member 14. In this manner, the clamp surface 36 is lifted from the clamp surface 56 so that there is a gap spacing therebetween into which the belt can be fit without having to manually lift the lower clamp member 14 off from the housing surface 56. The biasing device includes a guide member or bolt 91, as shown in FIGS. 15 and 16. The guide bolt 91 includes a relatively large diameter cylindrical shank 92, e.g., diameter of approximately 0.750 inch, that extends through a throughbore 94 in the upper wall portion 44 of the housing 12 to extends into the internal space 46 thereof. To allow the guide bolt 91 to be connected to the lower cam member 14, the upper cam member 16 includes a slot 95 that extends therethrough and generally lengthwise therealong through which the bolt shank 92 extends. The end of the cylindrical bolt shank 92 includes a threaded bore 96, and the lower cam clamp member 14 has a countersunk throughbore 98 to allow a screw fastener to be seated therein recessed from the clamping surface 36 and threaded into the guide bolt bore 96 for connecting the clamping member 14 to the biasing device 90. The bores 94 and 98 of the housing upper wall portion 44 and clamp member 14, respectively, can be generally centrally located therein.

Before inserting the bolt shank 92 through the wall bore 94 and slot 95, a coil spring 100 is fit thereon. With the guide bolt 91 inserted through the through opening 94 and the cam member slot 95 and fastened to the lower cam member 14, the coil spring 100 will be compressed between the upper enlarged upper bolt head 102 and the housing upper portion 44, and specifically enlarged counterbored portion 102 of the bore 94 in which the bottom coils of the spring 100 can be seated. In this manner, the biasing device 90 provides a constant upward bias to the lower cam member 14 so as to keep it raised away from the housing clamping surface 56 prior to application of an impact force to the upper clamp actuator member 16 which will drive the lower clamping member 14 downwardly against the bias force provided by the biasing device 90. Further, the device 90 also keeps the cam member 14 from sliding in the housing 12 so that when cammingly driven by the actuator cam member 16, the cam member 14 will be driven downwardly into tightly clamped engagement with the belt. The large bolt 91 transmits or reacts the friction loads generated during the clamping operation between the cam members 14 and 16 to the strong, extruded housing 12. Also, the length of slot 95 in the upper actuator member 16 defines the extent of travel thereof in the length direction in the housing 12. In the illustrated form, the slot 95 has a length of approximately 3.7 inches.

Figure 17:
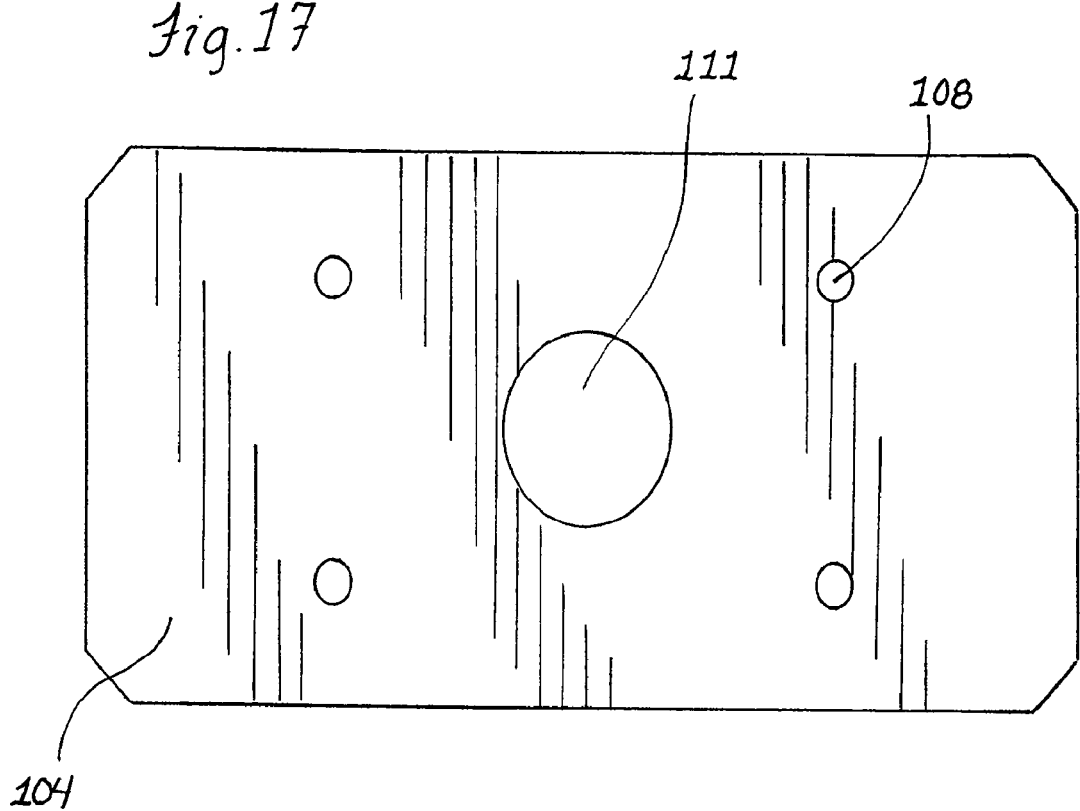
FIG. 17 is a plan view of a low friction, glide member for being attached to the upper inclined surface of the lower cam member.
Figure 18:
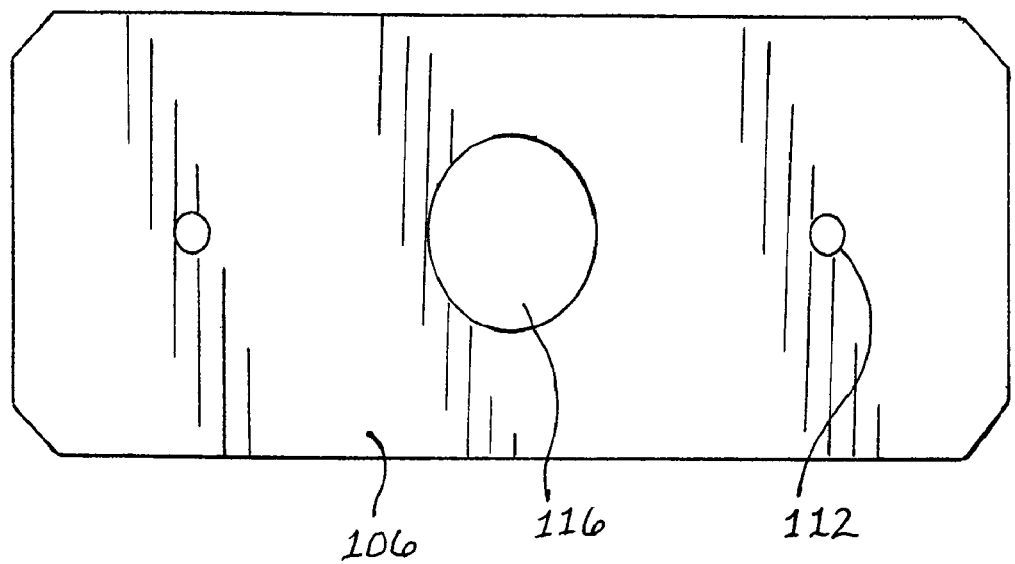
FIG. 18 is a plan view of a low friction, glide member for being attached in the housing at an upper portion thereof for engagement with the sliding upper cam member.

Referring next to FIGS. 17 and 18, a pair of low friction, glide members 104 and 106 are shown. The glide member 104 is preferably a thin sheet of low friction plastic material, such as an ultra high molecular weight polyethylene and is secured at the drive interface 20 between the cam members 14 and 16. In the illustrated and preferred form, the glide member 104 is secured to the inclined, ramp surface 22 of the lower clamp member 14 with fasteners that are received in aligned apertures 108 and 110 of the glide member 104 and the lower clamp member 14, respectively. In addition, the lower surface of the glide member 104 can be adhered to the clamp member surface 22. The glide member also has a central opening 111 sized to allow the guide bolt shank 92 to pass therethrough. The lower friction glide member 104 avoids any binding that might be caused by the metal to metal contact between the ramp surfaces 22 and 24 of the cam members 14 and 16 during a belt clamping and a belt pulling operation. In this regard, the cam members 14 and 16 are preferably of an aluminum material. It should be understood that when discussing the inter-engagement between the surfaces 22 and 24, low friction material preferably forms one or both these surfaces as provided by glide member 104 at surface 22. Similar to the glide member 104, glide member 106 is also advantageously employed at a sliding interface between the upper, clamp actuator member 16 and the housing 12, and specifically the upper surface 66 of the clamp actuator member 16, and the upper internal surface 65 of the housing wall portion 44. The glide member 106 can also be fastened and adhered to the housing wall portion 44 via respective aligned apertures 112 and 114 thereof. In addition, the glide member 106 is provided with an enlarged central opening 116 sized to allow the guide bolt shank 92 to pass therethrough. Similar to glide member 104, it should be understood that when discussing the inter-engagement between the surfaces 65 and 66, low friction material preferably forms one or both of these surfaces, as provided by glide member 106 at surface 65.

Referring to FIG. 2, the lower wall portion 42 of the housing 12 includes a pair through opening 118 aligned with the apertures 112 and 114. The openings 118 allow for tool access for the fasteners used to secure the glide member 106 to the housing upper wall portion 44. Similarly, the lower wall portion 42 of the housing 12 has a central through opening 120 between the openings 118 and aligned with the bore 98 of the clamp member 14 and the bolt shank 92 received therein including the threaded bore 96 thereof. The opening 120 allows for tool access for the fastener used to secure the clamp member 14 to the guide bolt 91.

Figure 19:
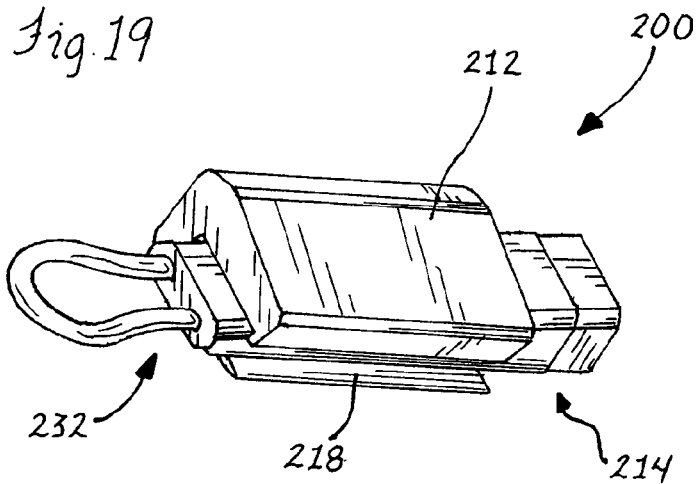
FIG. 19 is a perspective view of an alternative belt clamping apparatus in accordance with present invention showing a housing and a clamp member.
Figure 20:
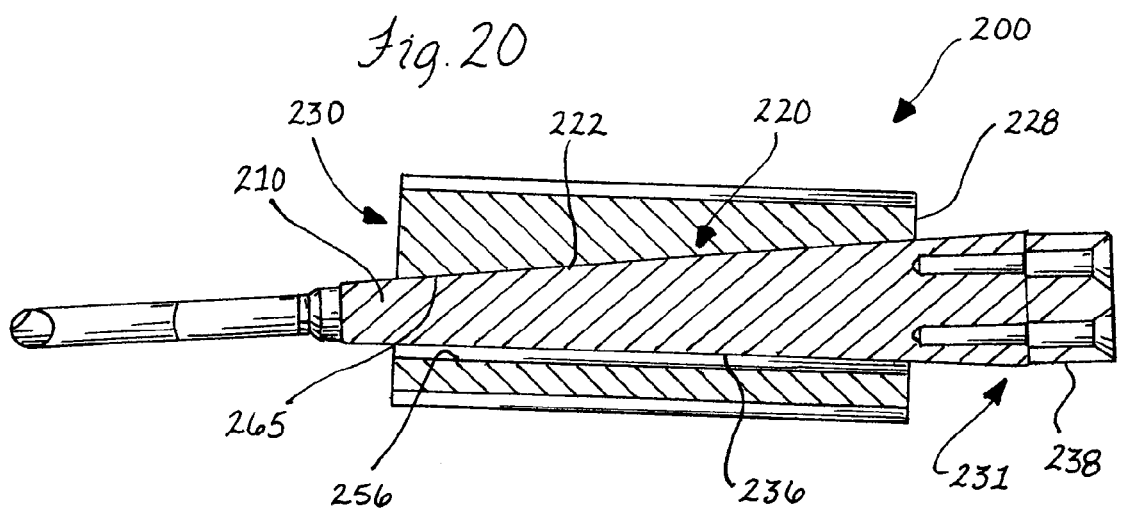
FIG. 20 is a cross-sectional view of the belt clamping apparatus of FIG. 19 showing cooperating ramp surfaces of the housing and the clamp member.

Referring next to FIGS. 19 and 20, an alternative belt clamp apparatus 200 is shown. The following description will focus on the differences between the belt clamp apparatus 10 and the belt clamp apparatus 200, with a repeated description of the otherwise similar or identical features generally omitted. The belt clamp apparatus 200 includes a housing 212 similar to housing 12 preferably having a generally C-shaped cross-sectional configuration. The primary difference between the belt clamp apparatus 10 and the belt clamp apparatus 200 is that the apparatus 200 lacks a separate clamp actuator member 16. Instead, the housing 212 has its corresponding upper internal surface 265 inclined with a cam drive interface 220 formed directly between the ramp surface 265 of the housing 212 and an upper surface 222 of the clamp member 214. In this regard, like the upper surface 22 of clamp member 14, the upper surface 222 is inclined. However, as can be seen in FIG. 20, the inclination of the ramp surface 222 is substantially opposite to that of ramp surface 22 for cammingly sliding against the housing ramp surface 265. More specifically, the ramp surfaces 222 and 265 extend from a generally upper position at housing end 228 down and along the length of the housing 212 toward a lower position at the opposite end 230 of the housing 212. Accordingly, the clamp member 214 has its small end 210 adjacent the housing end 230 with its large end 231 adjacent the housing end 228. In this regard, the clamp member 222 has a wedge configuration more similar to the wedge configuration of the actuator member 16.

Since the belt clamp 200 lacks such an actuator member, the clamp member 214 has its large end 231 adapted for receiving an impact force for cammingly driving the clamp member 214 into clamping engagement with the belt received in the housing 212 through the opening 218 to the housing 212 at the side thereof. Lower surface 236 of the clamp member 214 clamps the belt against the lower, inner surface 256 of the housing 212. Accordingly, the clamping member 214 has an impact receiving portion 231 and a clamping portion 236. In addition, the clamp member 214 also has a pull loop 232 connected to its small end 210 so that pull forces applied to the loop 232 cause the clamp member 214 to cammingly slide via the ramp surfaces 222 and 265 at the drive interface 220 into a tighter clamping engagement with the belt, as has previously been described with respect to belt clamp 10.

The impact receiving end 231 of the belt clamp member 214 preferably includes an impact receiving plate 238 fastened thereto similar to impact receiving plate 38 secured to the actuator member 16. Also, the pull loop 232 can be part of a pull loop assembly similar to the pull loop assembly 78 that is fastened to the actuator member 16 as previously described. Although avoiding a separate clamp actuator member 16, the belt clamp 200 generates a clamping action on the belt by having the clamp member 214 shift downwardly into engagement with the belt via the cam drive interface 220 while also moving along the belt surface as opposed to the belt clamp 10 which advantageously shifts the clamp member 14 exclusively in a perpendicular direction down into clamping engagement with the belt. In this manner, the clamp member 14 substantially avoids the potential damage to the belt that may be caused by the sliding of the clamp member 214 thereon during belt clamping and pulling operations, such as marring, scuffing or digging into the belt.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An apparatus for clamping a belt, the apparatus comprising:
    an elongate housing having opposite longitudinal ends, a predetermined length therebetween, opposite sides extending along the housing length including a side wall portion at one of the housing sides extending between the opposite longitudinal ends, and an elongate opening at the other housing side for receiving a side edge of a belt in the housing;
    opposite longitudinal end openings of the housing at the corresponding longitudinal ends thereof for allowing the belt to extend therethrough;
    a clamping device having a clamping portion that is operable to clamp the belt in the housing; and
    an impact portion of the clamping device adjacent one of the opposite longitudinal ends and the corresponding end opening of the housing and adapted to receive an impact force generally directed in a lengthwise direction from the one longitudinal end of the housing toward the other longitudinal end thereof for driving the clamping portion against the belt for quick clamping thereof in the housing,
    wherein the clamping device comprises a clamp member including the clamping portion and a separate actuator member including the impact portion at an end thereof, the impact end is adapted to receive an impact blow in a direction generally parallel to the belt, and the clamp member and actuator member include ramp surfaces that cooperate to cammingly drive the clamp member in a clamping direction in the housing that is transverse to the direction of the impact blow.

2. An apparatus for clamping a belt, the apparatus comprising:
    a housing having an opening for receiving a side edge of a belt therein;
    a clamping device having a clamping portion that is operable to clamp the belt in the housing; and
    an impact portion of the clamping device adapted to receive an impact force for driving the clamping portion against the belt for quick clamping thereof in the housing,
    wherein the clamping device comprises a clamp member including the clamping portion and a separate actuator member including the impact portion at an end thereof, and the actuator member has a pull loop at an end opposite to the impact receiving end thereof so that application of a pull force to the pull loop causes the clamp member to be cammingly driven in a clamping direction in the housing via ramp surfaces of the clamp member and the actuator member.

3. An apparatus for clamping a belt, the apparatus comprising:
    a housing having an opening for receiving a side edge of a belt therein;
    a clamping device having a clamping portion that is operable to clamp the belt in the housing;
    an impact portion of the clamping device adapted to receive an impact force for driving clamping portion against the belt for quick clamping thereof in the housing, wherein the clamping device includes a clamp member having the clamping and impact portions; and
    ramp surfaces of the housing and the clamp member that cooperate to cammingly drive the clamp member in a clamping direction in the housing for clamping of the belt with clamping portion upon application of an impact force to the impact portion of the clamp member,
    wherein the clamp member has the impact portion at one end thereof and a pull loop at an opposite end thereof so that application of a pull force to the pull loop causes the clamp member to be cammingly driven in the clamping direction in the housing via the ramp surfaces of the housing and the clamp member.

4. An apparatus for clamping a belt, the apparatus comprising:
    a housing having an opening for receiving a side edge of the belt therein;
    a clamp member in the housing for exerting a clamping force on the belt;
    a clamp actuator for driving the clamping member against the belt; and
    an impact portion of the clamp actuator adapted to receive an impact force for driving the clamping member against the belt for quick clamping thereof with the clamping member, wherein the clamp member and clamp actuator have a cam interface therebetween so that the clamp actuator cammingly drives the clamp member upon application of an impact force to the clamp actuator.

5. The apparatus of claim 4 wherein the impact portion is disposed outside the housing for receiving an impact blow.

6. The apparatus of claim 4 wherein the cam interface between the clamp member and the clamp actuator is configured so that application of an impact force in a direction generally parallel to the belt causes the clamp member to be driven downwardly in the housing toward the belt.

7. An apparatus for clamping a belt, the apparatus comprising:
   a housing having an opening for receiving a side edge of the belt therein;
   a clamp member in the housing for exerting a clamping force on the belt;
   a clamp actuator for driving the clamping member against the belt; and
   an impact portion of the clamp actuator adapted to receive an impact force for driving the clamping member against the belt for quick clamping thereof with the clamping member,
   wherein the clamp member has a lower clamping surface extending generally parallel to the belt in the housing and an upper ramp surface extending at a predetermined incline to the lower clamping surface, and the clamp actuator has a lower ramp surface extending at a predetermined incline with the ramp surfaces cooperating to cam the lower clamp surface tightly against the belt upon application of an impact force to the clamp actuator.

8. The apparatus of claim 7 wherein the predetermined incline of both of the ramp surfaces is the same.

9. The apparatus of claim 7 wherein the ramp surfaces are of low-friction material.

10. The apparatus of claim 7 wherein the predetermined incline has a maximum inclination angle of approximately 12 degrees.

11. The apparatus of claim 7 wherein the impact portion is at one end of the clamp actuator and an opposite end of the clamp actuator includes a pull loop with the ramp surfaces being inclined to extend generally upwardly toward the pull loop so that exerting a pull force on the pull loop will increase the clamp force applied by the lower clamp surface on the belt.

12. The apparatus of claim 7 wherein the clamp member and clamp actuator have predetermined lengths coordinated with the predetermined incline so that upon application of a sufficient impact force to the clamp actuator impact portion, the clamp actuator cammingly drives the clamp member into a clamped and prelocked position against the belt for subsequent pulling of the clamped belt.

13. The apparatus of claim 7 wherein the clamp actuator has a slot, and a biasing device is connected to an upper portion of the housing, extends through the slot and is connected to the clamp member to draw the clamp member upwardly with the ramp surfaces engaged and the lower clamp surface spaced from a lower portion of the housing for fitting the belt therebetween.

14. An apparatus for clamping a belt, the apparatus comprising:
   a housing having an opening for receiving a side edge of the belt therein;
   a clamp member in the housing for exerting a clamping force on the belt;
   a clamp actuator for driving the clamping member against the belt; and
   an impact portion of the clamp actuator adapted to receive an impact force for driving the clamping member against the belt for quick clamping thereof with the clamping member,
   wherein the housing has a high-strength, extruded C-shaped configuration including a generally vertical base wall portion and upper and lower arm portions that have a tapering cross-sectional thickness in a direction away from the base wall portion so that the arm portions are thicker adjacent the base wall portion than further therefrom.

15. The apparatus of claim 14 including low friction material between the clamp actuator and the upper arm portion, and the clamp member and the clamp actuator.

16. A method of clamping a belt for a belt pulling operation, the method comprising:
   fitting a side edge of a belt into a housing under a clamping device;
   impacting an end of the clamping device to drive a clamping portion thereof in the housing toward the belt;
   clamping the belt with the clamping portion against a clamping surface in the housing to lock the clamping portion against the belt in a prelocked position in the housing, wherein the clamping device is impacted by applying an impact force thereto in a direction generally parallel to the side edge of the belt received in the housing; and
   cammingly driving the clamping portion toward the belt by impacting the clamping device end.

17. The method of claim 16 wherein the clamping portion is cammingly driven by sliding a ramp surface of a clamp member of the clamping device with the clamp member including both the impact receiving end and clamping portion thereof against a cooperating ramp surface of the housing.

18. A method of clamping a belt for a belt pulling operation, the method comprising:
   fitting a belt into a housing under a clamping device;
   impacting an end of the clamping device to drive a clamping portion thereof in the housing toward the belt;
   cammingly driving the clamping portion toward the belt by impacting the clamping device end; and
   clamping the belt with the clamping portion against a clamping surface in the housing to lock the clamping portion against the belt in a prelocked position in the housing,
   wherein the clamping portion is cammingly driven by sliding of a ramp surface of an actuator member of the clamping device including the impact receiving end thereof against a cooperating ramp surface of a clamp member of the clamping device with the clamp member including the clamping portion of the clamping device.

19. The method of claim 18 including sliding another ramp surface of the actuator member against a cooperating surface of the housing during cam driving of the clamp member.

20. A method of clamping a belt for a belt pulling operation, the method comprising:
   fitting a belt into a housing under a clamping device;
   impacting an end of the clamping device to drive a clamping portion thereof in the housing toward the belt; and
   clamping the belt with the clamping portion against a clamping surface in the housing to lock the clamping portion against the belt in a prelocked position in the housing,
   wherein the belt is fit in the housing by biasing the clamping device upwardly in the housing so the belt can be fit thereunder.

21. A method of clamping a belt for a belt pulling operation, the method comprising:

fitting a side edge of a belt into a housing under a clamping device;

impacting an end of the clamping device to drive a clamping portion thereof in the housing toward the belt;

clamping the belt with the clamping portion against a clamping surface in the housing to lock the clamping portion against the belt in a prelocked position in the housing, wherein the clamping device is impacted by applying an impact force thereto in a direction generally parallel to the side edge of the belt received in the housing; and pulling the clamped belt for performing a belt maintenance operation thereon.

22. The method of claim 21 wherein pulling the belt increases the clamp force applied by the prelocked clamp member against the belt.

23. A method of clamping a belt for a belt pulling operation, the method comprising:

fitting a belt into a housing under a clamping device;

impacting an end of the clamping device to drive a clamping portion thereof in the housing toward the belt;

clamping the belt with the clamping portion against a clamping surface in the housing to lock the clamping portion against the belt in a prelocked position in the housing; and pulling the clamped belt for performing a belt maintenance operation thereon, wherein the clamped belt is pulled by pulling the clamping device at an end thereof opposite to the end that is impacted.

* * * * *